United States Patent
Shi

(10) Patent No.: US 10,191,197 B2
(45) Date of Patent: Jan. 29, 2019

(54) BACKLIGHT MODULE AND DISPLAY DEVICE

(71) Applicants: BOE TECHNOLOGY GROUP CO., LTD., Beijing (CN); HEFEI BOE DISPLAY LIGHTING CO., LTD., Anhui (CN)

(72) Inventor: Zuchuan Shi, Beijing (CN)

(73) Assignees: BOE TECHNOLOGY GROUP CO., LTD. (CN); HEFEI BOE DISPLAY LIGHTING CO., LTD. (CN)

( * ) Notice: Subject to any disclaimer, the term of this patent is extended or adjusted under 35 U.S.C. 154(b) by 0 days.

(21) Appl. No.: 15/646,671

(22) Filed: Jul. 11, 2017

(65) Prior Publication Data

US 2018/0039008 A1 Feb. 8, 2018

(30) Foreign Application Priority Data

Aug. 3, 2016 (CN) .......................... 2016 1 0630155

(51) Int. Cl.
*F21V 8/00* (2006.01)

(52) U.S. Cl.
CPC ......... *G02B 6/0028* (2013.01); *G02B 6/0008* (2013.01); *G02B 6/0025* (2013.01); *G02B 6/0068* (2013.01); *G02B 6/0073* (2013.01)

(58) Field of Classification Search
CPC .. G02B 6/0028; G02B 6/0073; G02B 6/0068; G02B 6/0008; G02B 6/0025; G02B 6/0031; G02F 1/133553; G02F 1/133555; G02F 1/133605; G02F 2001/133557
See application file for complete search history.

(56) References Cited

U.S. PATENT DOCUMENTS

| | | | |
|---|---|---|---|
| 2013/0016133 A1* | 1/2013 | Chen | G09G 3/3426 345/690 |
| 2015/0293293 A1 | 10/2015 | Hu et al. | |
| 2016/0343308 A1* | 11/2016 | Hasegawa | G02F 1/133308 |
| 2018/0031752 A1* | 2/2018 | Ferrini | G02B 6/0016 |

FOREIGN PATENT DOCUMENTS

| | | |
|---|---|---|
| CN | 101963311 A | 2/2011 |
| CN | 103017090 A | 4/2013 |
| CN | 205139416 U | 4/2016 |
| JP | H09197132 A | 7/1997 |
| JP | 2000231816 A | 8/2000 |
| JP | 2002245831 A | 8/2002 |

OTHER PUBLICATIONS

First Office Action for Chinese Application No. 201610630155.2, dated Oct. 9, 2018, 7 Pages.

* cited by examiner

*Primary Examiner* — Joseph L Williams
*Assistant Examiner* — Jose M Diaz
(74) *Attorney, Agent, or Firm* — Brooks Kushman P.C.

(57) ABSTRACT

A backlight module and a display device are provided. The backlight module includes a light-guiding plate and a light bar arranged at a light incident side of the light-guiding plate. The backlight module further includes a light beam processing device arranged at an outside of the light-guiding plate to collect light beams not entered into the light-guiding plate, and configured to transmit the collected light beams to a light compensation position to emit the collected light beams into the light-guiding plate.

18 Claims, 5 Drawing Sheets

BACKLIGHT MODULE AND DISPLAY DEVICE

CROSS-REFERENCE TO RELATED APPLICATION

The present application claims priority to Chinese patent application No. 201610630155.2 filed on Aug. 3, 2016, the disclosure of which is incorporated herein in its entirety by reference.

TECHNICAL FIELD

The present disclosure relates to the field of display technology, and more particularly to a backlight module and a display device.

BACKGROUND

In a liquid crystal display, a LED light bar is usually used as a light source, since each LED in the LED light bar is a point light source, light beams may not travel to a corner of a light incident side of a light-guiding plate, resulting in a dark corner.

In addition, when light beams of the LED light bar are emitted onto the light-guiding plate, a refraction and a reflection will occur at the light incident side of the light-guiding plate, and the refracted light beams enter into the light-guiding plate and are utilized, while most of the reflected light beams may not be utilized, therefore there is a problem of a low utilization of light beams.

SUMMARY

An object of the present disclosure is to provide a backlight module and a display device capable of collecting light beams failed to be used at an outside of the light-guiding plate, and transmitting the collected light beams to a light compensation position for reuse.

The technical solution provided by the present disclosure is as follows.

A backlight module includes a light-guiding plate; a light bar arranged at a light incident side of the light-guiding plate; and a light beam processing device arranged at an outside of the light-guiding plate to collect light beams not entered into the light-guiding plate, and transmit the collected light beams to a light compensation position to emit the collected light beams into the light-guiding plate.

Furthermore, the light compensation position includes a corner of the light incident side of the light-guiding plate.

Furthermore, the light beam processing device includes a plurality of optical fibers, and each of the plurality of optical fibers includes a light incident end, an optical fiber body and a light-exiting end.

Furthermore, the light incident end is arranged at the outside of the light-guiding plate to collect light beams not entered into the light-guiding plate; the light-exiting end is arranged at the light compensation position to emit the light beams transmitted by the optical fiber body at the light compensation position.

Furthermore, the light incident end of the optical fiber is arranged at the light incident side of the light-guiding plate to collect light beams reflected by the light incident side of the light-guiding plate.

Furthermore, the light incident ends of the plurality of optical fibers are arranged successively at light compensation intervals along an extension direction of the light bar.

Furthermore, the light incident ends of the plurality of optical fibers are arranged successively at same light compensation intervals along the extension direction of the light bar, and each LED lamp on the light bar at least corresponds to two light incident ends of two optical fibers.

Furthermore, a quantity of the light incident ends of the plurality of optical fibers is an integral multiple of that of the LED lamps on the light bar.

Furthermore, the light beam processing device further includes a light-guiding structure arranged at the light-exiting end of the optical fiber to guide light beams emitted by the light-exiting end of the optical fiber to enter into the light-guiding plate.

Furthermore, the light-guiding structure includes a prism, the prism includes a prism light incident surface arranged at the light-exiting end of the optical fiber, a prism light-exiting surface opposite to a side of the light-guiding plate at the light compensation position and a prism reflective surface for reflecting incident light beams emitted by the prism light incident surface to the prism light-exiting surface.

Furthermore, the prism reflective surface is provided with a reflective membrane, or the prism reflective surface is coated with a reflective coating layer.

Furthermore, the light-exiting end of the optical fiber and the light-guiding structure are arranged at one corner of the light incident side of the light-guiding plate.

Furthermore, the light-exiting end of the optical fiber and the light-guiding structure are arranged at two corners of the light incident side of the light-guiding plate.

Furthermore, the light bar includes a printed circuit board and LED lamps arranged on the printed circuit board, the light incident end of the optical fiber is arranged on the printed circuit board of the light bar, and located under the LED lamps.

Furthermore, the optical fiber is adhesively fixed on the printed circuit board of the light bar.

Furthermore, the optical fiber is fixed on a backboard.

A display device includes the backlight module described above.

The benefit effects of the present disclosure are as follows.

The backlight module provided by the present disclosure, by using the arranged light beam processing device, may collect unused light beams at an outside of the light-guiding plate (e.g., light beams reflected by the light incident side of the light-guiding plate), and guide the collected light beams to a light compensation position where the light beams are needed (e.g., a dark corner of the light-guiding plate), thus collecting the unused light beams for reuse.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
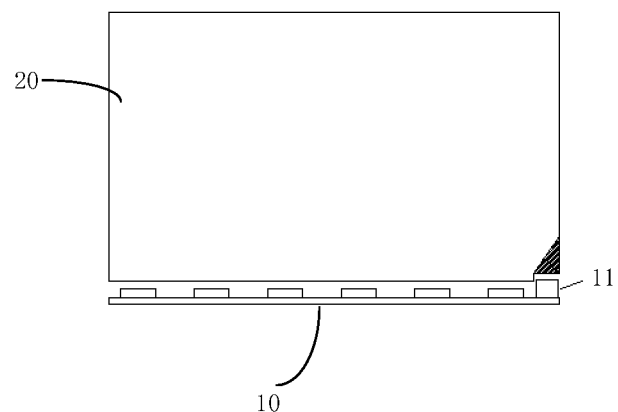
FIG. 1 is a schematic view showing an appearance of a dark corner in a light-guiding plate of a backlight module in a related art.
Figure 2:
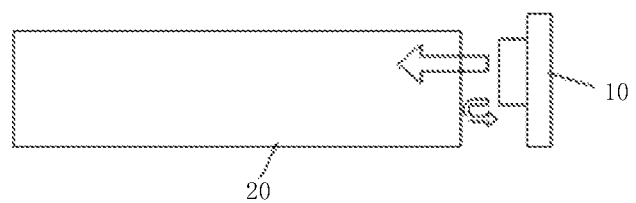
FIG. 2 is a schematic view showing a reflection of light beams on a light incident side surface of the light-guiding plate of a backlight module in a related art.

In a liquid crystal display, as shown in FIG. 1, a LED light bar 10 of an edge type backlight module is arranged at a light incident side of a light-guiding plate 20, and a tail end of the LED light bar 10 is provided with a protruded connector 11. In order to leave a space for the connector 11, the light incident side of the light-guiding plate 20 will be performed with a corner-cutting treatment, making the light beams more difficult to travel to the corner. In addition, as shown in FIG. 2, when the light beams of the LED light bar 10 are emitted onto the light-guiding plate 20, a refraction and a reflection will occur at the light incident side of the light-guiding plate 20, and the refracted light beams enter into the light-guiding plate 20 and are utilized, while most of the reflected light beams may not be utilized.

Figure 3:
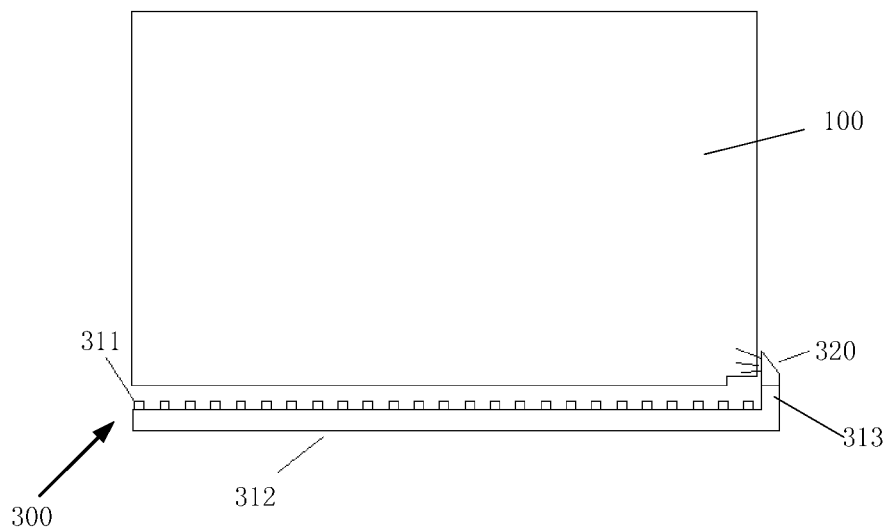
FIG. 3 is a schematic view showing a structure of a light-guiding plate of a backlight module and a light beam processing device according to at least one embodiment of the present disclosure.
Figure 4:
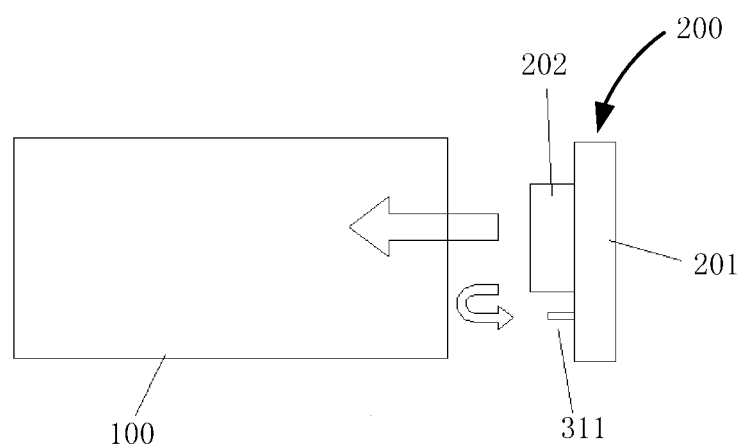
FIG. 4 is a side view showing a backlight module whose light incident side of a light-guiding plate is not provided with a light-guiding structure according to at least one embodiment of the present disclosure.
Figure 5:
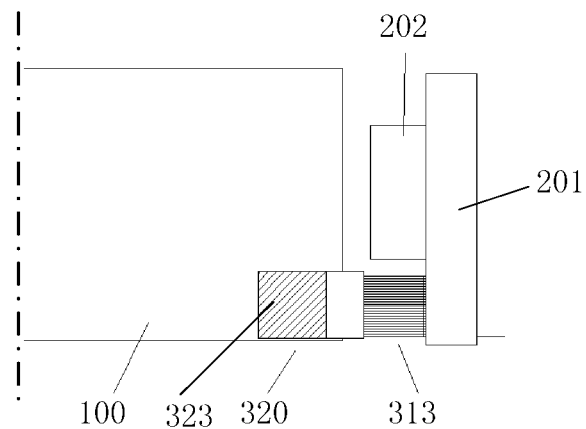
FIG. 5 is a side view showing a backlight module whose light incident side of the light-guiding plate is provided with a light-guiding structure according to at least one embodiment of the present disclosure.

As shown in FIG. 3 to FIG. 5, a backlight module provided by at least one embodiment of the present disclosure includes a light-guiding plate 100 and a light bar 200 arranged at a light incident side of the light-guiding plate 100. The backlight module further includes a light beam processing device 300 arranged at an outside of the light-guiding plate 100 to collect light beams not entered into the light-guiding plate 100, and configured to transmit the collected light beams to a light compensation position to emit the collected light beams into the light-guiding plate 100.

The backlight module provided by at least one embodiment of the present disclosure, by using the light beam processing device 300, may collect light beams which are not utilized at an outside of the light-guiding plate 100 (e.g., light beams reflected by the light incident side of the light-guiding plate 100), and guide the collected light beams to a light compensation position where the light beams are needed (e.g., a dark corner of the light-guiding plate 100), thus collecting the light beams for reuse.

Figure 9:
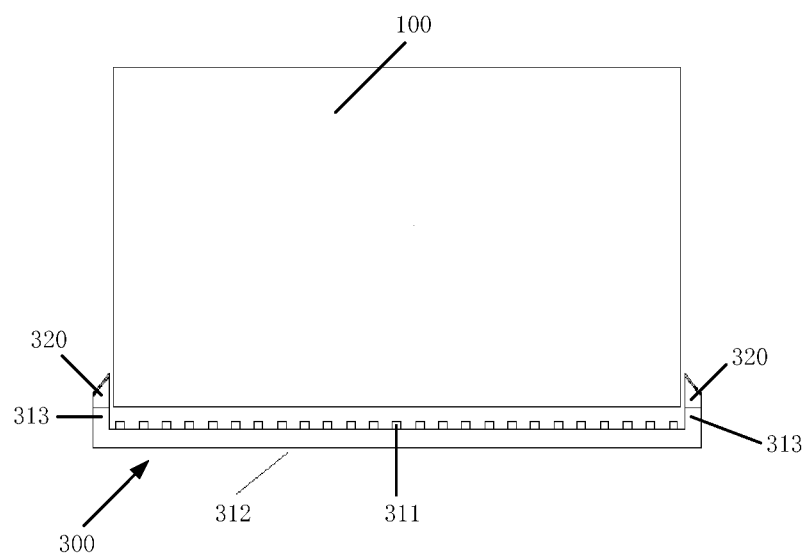
FIG. 9 is a schematic view showing a structure of a light-guiding plate of a backlight module and a light beam processing device according to at least one embodiment of the present disclosure.

In the backlight module according to at least one embodiment of the present disclosure, optionally, as shown in FIG. 3 and FIG. 9, the light compensation position includes a corner of the light incident side of the light-guiding plate 100. That is, the light beam processing device 300 may collect light beams not entered into the light-guiding plate 100 from an outside of light-guiding plate 100, and transmit the collected light beams to a dark corner of the light-guiding plate 100 to compensate the dark corner.

Obviously, it should be understood that, the light compensation position is not limited to the corner of the light incident side of the light-guiding plate 100, and may also be other positons, that is, in a practical application, the light beam processing device 300 may also transmit the collected light beams to other positions to use.

In addition, in the backlight module according to at least one embodiment of the present disclosure, optionally, as shown in FIG. 3, the light beam processing device 300 includes a plurality of optical fibers 310, and each of the plurality of optical fibers 310 includes a light incident end 311, an optical fiber body 312 and a light-exiting end 313. The light incident end 311 is arranged at the outside of the light-guiding plate 100 to collect light beams not entered into the light-guiding plate 100. The light-exiting end 313 is arranged at the light compensation position to emit the light beams transmitted by the optical fiber body 312 at the light compensation position.

Adopting the above solution, the light beam processing device mainly adopts the optical fibers 310 to collect and transmit light beams, and the light beam processing device 300 has the light incident ends 311 of the plurality of optical fibers 310 for widely collecting light beams which are not utilized, and transmitting the collected light beams to the light compensation position through the optical fibers 310. It should be noted that, in a practical application, the light beam processing device 300 may also adopt other structures to collect and transmit the light beams, which shall not be limited herein.

In addition, in the embodiments of the present disclosure, optionally, as shown in FIG. 3 to FIG. 5, the light incident end 311 of the optical fiber 310 is arranged at the light incident side of the light-guiding plate 100 to collect the light beams reflected by the light incident side of the light-guiding plate 100.

Adopting the above solution, the light beam processing device 300 may reutilize the light beams reflected by the light incident side of the light-guiding plate 100. It should be understood that, in other embodiments, the light incident end 311 of the optical fiber 310 may also be arranged at outsides of other positons of the light-guiding plate 100 to collect light beams not entered into the light-guiding plate 100 from other positions.

Figure 6:
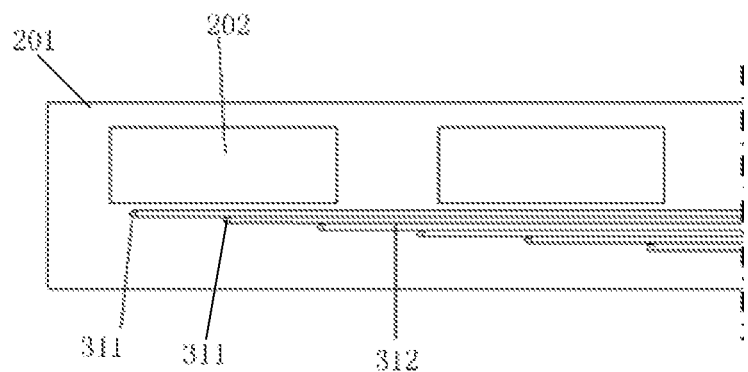
FIG. 6 is a front view showing a LED light bar in the backlight module according to at least one embodiment of the present disclosure.
Figure 7:
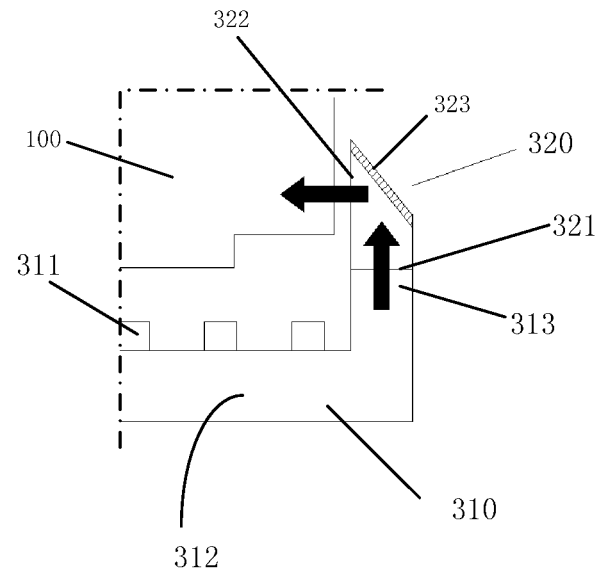
FIG. 7 is a schematic view showing a positional relationship between the light-guiding structure of the light beam processing device and a corner of a light incident side of the light-guiding plate of the backlight module according to at least one embodiment of the present disclosure.
Figure 8:
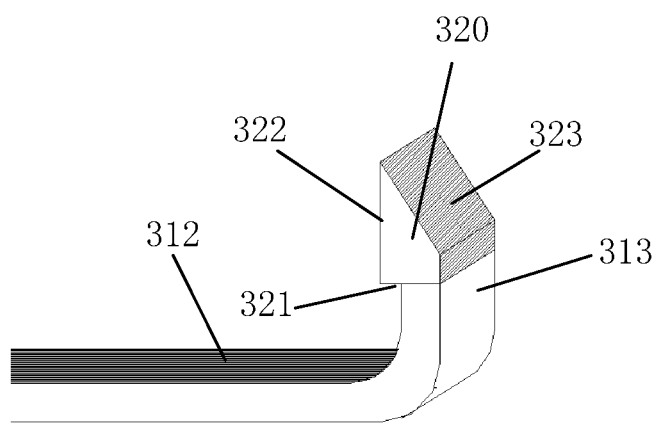
FIG. 8 is a solid schematic view showing the light-guiding structure of the light beam processing device in the backlight module according to at least one embodiment of the present disclosure.

In addition, in the embodiments according to the present disclosure, optionally, as shown in FIG. 6, the light incident ends 311 of the plurality of the optical fibers 310 are arranged successively at pre-determined intervals along an extension direction of the light bar 200.

Adopting the above solution, the densely-distributed optical fibers 310 are used to collect light beams reflected by the light incident side surface of the light-guiding plate 100, and the light incident ends 311 of the plurality of optical fibers 310 are arranged successively at pre-determined intervals along the extension direction of the light bar 200 to collect light beams reflected at different positions of the light incident side of the light-guiding plate 100.

Optionally, the light incident ends 311 of the plurality of optical fibers 310 are evenly arranged at pre-determined and same intervals along the extension direction of the light bar 200. Moreover, as shown in FIG. 6, each LED lamp 202 on the light bar 200 at least corresponds to two light incident ends 311 of two optical fibers 310. Furthermore, optionally, a quantity of the light incident ends 311 of the plurality of optical fibers 310 is an integral multiple of that of LED lamps 202 on the light bar 200.

Adopting the above solution, it can be ensured that the light incident ends of the plurality of optical fibers are capable of evenly collecting light beams reflected at different positions of the light incident side of the light-guiding plate 100, making the collection of light beams more effective.

In the embodiments according to the present disclosure, optionally, as shown in FIG. 4 and FIG. 5, the light bar 200 includes a printed circuit board 201 and LED lamps 202 arranged on the printed circuit board 201. The light incident end 311 of the optical fiber 310 is arranged on the printed circuit board 201 of the light bar 200, and located under the LED lamps 202. The optical fiber 310 may be adhesively fixed on the printed circuit board (PCB) of the light bar 200.

In other embodiments of the present disclosure, the optical fiber 310 may also be fixed on a backboard.

In addition, in the embodiments according to the present disclosure, optionally, as shown in FIG. 3, FIG. 5, FIG. 7 and FIG. 8, the light beam processing device 300 further includes a light-guiding structure arranged at the light-exiting end 313 of the optical fiber 310 to conduct light beams emitted by the light-exiting end 313 of the optical fiber 310 to enter into the light-guiding plate 100. By arranging the light-guiding structure, the light beams may be emitted into the light-guiding plate 100 in a pre-determined direction.

In this embodiment, optionally, as shown in FIG. 5 to FIG. 8, the light-guiding structure includes a prism 320, the prism 320 includes a prism light incident surface 321 arranged at the light-exiting end 313 of the optical fiber 310, a prism light-exiting surface 322 opposite to a side of the light-guiding plate 100 at the light compensation position and a prism reflective surface 323 for reflecting incident light beams emitted by the prism light incident surface 321 to the prism light-exiting surface 322, and the prism reflective surface 323 is provided with a reflective membrane, or the prism reflective surface 323 is coated with a reflective coating layer.

Adopting the above solution, the prism 320 may be adopted as a light-guiding structure, the structure of which is simple. The prism 320 may has multiple forms of structure, which shall not be limited herein.

What should be further noted is that, in the embodiment according to the present disclosure, as shown in FIG. 3, the light-exiting end 313 of the optical fiber 310 and the light-guiding structure are arranged at one corner of the light incident side of the light-guiding plate 100. In other embodiments, as shown in FIG. 9, the light-exiting end 313 of the optical fiber 310 and the light-guiding structure may also be arranged at two corners of the light incident side of the light-guiding plate 100.

In addition, the present disclosure further provides in some embodiments a display device including the backlight module described above.

The above are merely the preferred embodiments of the present disclosure, and it should be noted that, a person skilled in the art may make improvements and modifications without departing from the principle of the present disclosure, and these improvements and modifications shall also fall within the scope of the present disclosure.

What is claimed is:

1. A backlight module, comprising:
   a light-guiding plate;
   a light bar arranged at a light incident side of the light-guiding plate; and
   a light beam processing device arranged at an outside of the light-guiding plate to collect light beams not entered into the light-guiding plate, and configured to transmit the collected light beams to a light compensation position to emit the collected light beams into the light-guiding plate,
   wherein the light beam processing device comprises a plurality of optical fibers, and each of the plurality of optical fibers comprises a light incident end, an optical fiber body and a light-exiting end.

2. The backlight module according to claim 1, wherein the light compensation position comprises a corner of the light incident side of the light-guiding plate.

3. The backlight module according to claim 1, wherein the light incident end is arranged at the outside of the light-guiding plate to collect light beams not entered into the light-guiding plate; the light-exiting end is arranged at the light compensation position to emit the light beams transmitted by the optical fiber body at the light compensation position.

4. The backlight module according to claim 1, wherein the light incident end of the optical fiber is arranged at the light incident side of the light-guiding plate to collect light beams reflected by the light incident side of the light-guiding plate.

5. The backlight module according to claim 4, wherein the light incident ends of the plurality of the optical fibers are arranged successively at pre-determined intervals along an extension direction of the light bar.

6. The backlight module according to claim 5, wherein the light incident ends of the plurality of optical fibers are arranged successively at pre-determined and same intervals along the extension direction of the light bar, and each LED lamp on the light bar at least corresponds to two light incident ends of two optical fibers.

7. The backlight module according to claim 6, wherein a quantity of the light incident ends of the plurality of optical fibers is an integral multiple of that of LED lamps on the light bar.

8. The backlight module according to claim 1, wherein the light beam processing device further comprises a light-guiding structure arranged at the light-exiting end of the optical fiber to guide light beams emitted by the light-exiting end of the optical fiber to enter into the light-guiding plate.

9. The backlight module according to claim 8, wherein the light-guiding structure comprises a prism, the prism comprises a prism light incident surface arranged at the light-exiting end of the optical fiber, a prism light-exiting surface opposite to a side of the light-guiding plate at the light compensation position and a prism reflective surface for reflecting incident light beams emitted by the prism light incident surface to the prism light-exiting surface.

10. The backlight module according to claim 9, wherein the prism reflective surface is provided with a reflective membrane, or the prism reflective surface is coated with a reflective coating layer.

11. The backlight module according to claim 8, wherein the light-exiting end of the optical fiber and the light-guiding structure are arranged at one corner of the light incident side of the light-guiding plate.

12. The backlight module according to claim 8, wherein the light-exiting end of the optical fiber and the light-guiding structure are arranged at two corners of the light incident side of the light-guiding plate.

13. The backlight module according to claim 1, wherein the light bar comprises a printed circuit board and LED lamps arranged on a printed circuit board, the light incident end of the optical fiber is arranged on the printed circuit board of the light bar, and located under the LED lamps.

14. The backlight module according to claim 13, wherein the optical fiber is adhesively fixed on the printed circuit board of the light bar.

15. The backlight module according to claim 1, wherein the optical fiber is fixed on a backboard.

16. A display device comprising a backlight module, wherein the backlight module comprises:
   a light-guiding plate;
   a light bar arranged at a light incident side of the light-guiding plate; and
   a light beam processing device arranged at an outside of the light-guiding plate to collect light beams not entered into the light-guiding plate, and configured to transmit the collected light beams to a light compensation position to emit the collected light beams into the light-guiding plate,
   wherein the light beam processing device comprises a plurality of optical fibers, and each of the plurality of optical fibers comprises a light incident end, an optical fiber body and a light-exiting end.

17. The display device according to claim 16, wherein the light compensation position comprises a corner of the light incident side of the light-guiding plate.

18. The display device according to claim 16, wherein, the light incident end is arranged at an outside of the light-guiding plate to collect light beams not entered into the light-guiding plate; the light-exiting end is arranged at the light compensation position to emit the light beams transmitted by the optical fiber body at the light compensation position.

* * * * *